United States Patent
Higo et al.

(10) Patent No.: US 11,467,797 B2
(45) Date of Patent: Oct. 11, 2022

(54) VIRTUAL WORLD CONSTRUCTION SYSTEM AND METHOD

(71) Applicant: Nippon Telegraph and Telephone Corporation, Tokyo (JP)

(72) Inventors: Naoki Higo, Tokyo (JP); Ryota Ishibashi, Tokyo (JP); Takuma Tsubaki, Tokyo (JP); Kojun Koshiji, Tokyo (JP); Toshimitsu Tsubaki, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/264,010

(22) PCT Filed: Aug. 1, 2019

(86) PCT No.: PCT/JP2019/030333
§ 371 (c)(1),
(2) Date: Jan. 28, 2021

(87) PCT Pub. No.: WO2020/027294
PCT Pub. Date: Feb. 6, 2020

(65) Prior Publication Data
US 2022/0027116 A1   Jan. 27, 2022

(30) Foreign Application Priority Data

Aug. 3, 2018 (JP) .............................. JP2018-146591

(51) Int. Cl.
*G06T 1/00* (2006.01)
*G06F 3/14* (2006.01)
(Continued)

(52) U.S. Cl.
CPC ............ *G06F 3/1454* (2013.01); *G06T 15/00* (2013.01); *H04N 21/242* (2013.01); *H04N 21/816* (2013.01)

(58) Field of Classification Search
CPC . G06T 19/006; G06T 1/00; G06F 3/01; G06F 3/1454; G06F 9/5072; G06F 17/00
See application file for complete search history.

(56) References Cited

U.S. PATENT DOCUMENTS

2010/0274848 A1 * 10/2010 Altmaier ............... H04L 67/104
                                                               709/203
2018/0234341 A1 *  8/2018 Ignatchenko ......... H04L 45/302

OTHER PUBLICATIONS

Cheung et al., "Multi-Stream Switching for Interactive Virtual Reality Video Streaming," 2017 IEEE International Conference on Image Processing (ICIP), Sep. 17-20, 2017, 6 pages.
(Continued)

*Primary Examiner* — Hau H Nguyen
(74) *Attorney, Agent, or Firm* — Fish & Richardson P.C.

(57) ABSTRACT

Provided is a virtual world construction system that does not impair consistency between virtual worlds and places only small loads on terminals. A client application 10 that is implemented on a user terminal, a plurality of server applications 20 that are implemented on servers, and a proxy 30 that is located on a communication path between the user terminal and the servers and relays operation information and video information are provided. The proxy 30 includes a motion duplication unit 31 that transmits operation information to the plurality of servers by duplicating the operation information, and a video integration/rendering control unit 32 that transmits timing information regarding rendering timing to the plurality of servers, and transmits video information received from at least one of the servers, to the user terminals. A rendering processing unit/video processing unit 23 of each of the servers performs rendering processing
(Continued)

and video information transmission processing based on the timing information received from the proxy 30.

10 Claims, 13 Drawing Sheets

(51) Int. Cl.
*G06T 15/00* (2011.01)
*H04N 21/242* (2011.01)
*H04N 21/81* (2011.01)

(56) References Cited

OTHER PUBLICATIONS

Gao et al., "Concealing Jitter in Multi-Player Online Games through Predictive Behaviour Modeling," 2016 IEEE 20th International Conference Computer Supported Cooperative Work in Design, 2016, pp. 62-67.

* cited by examiner

Fig. 2
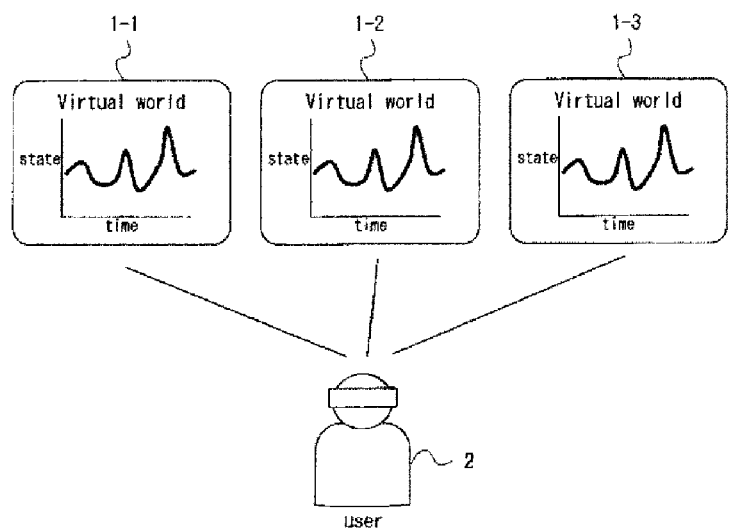
(a) USERS : VIRTUAL WORLDS = 1 : N
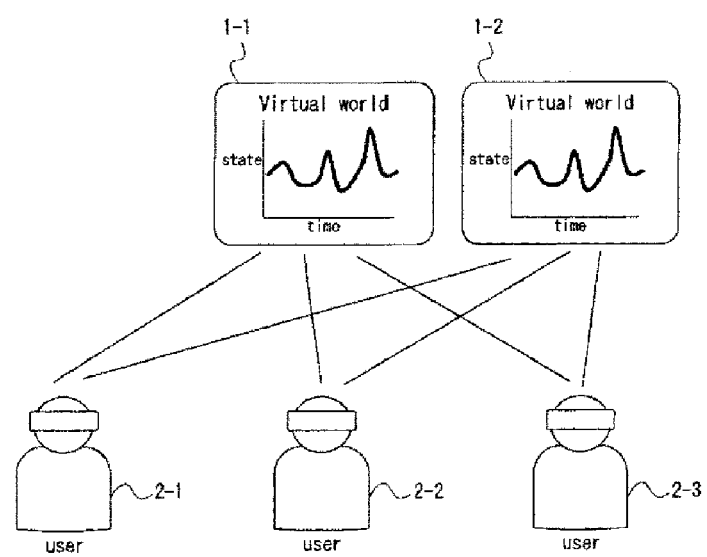
(a) USERS : VIRTUAL WORLDS = N : M

Fig. 7

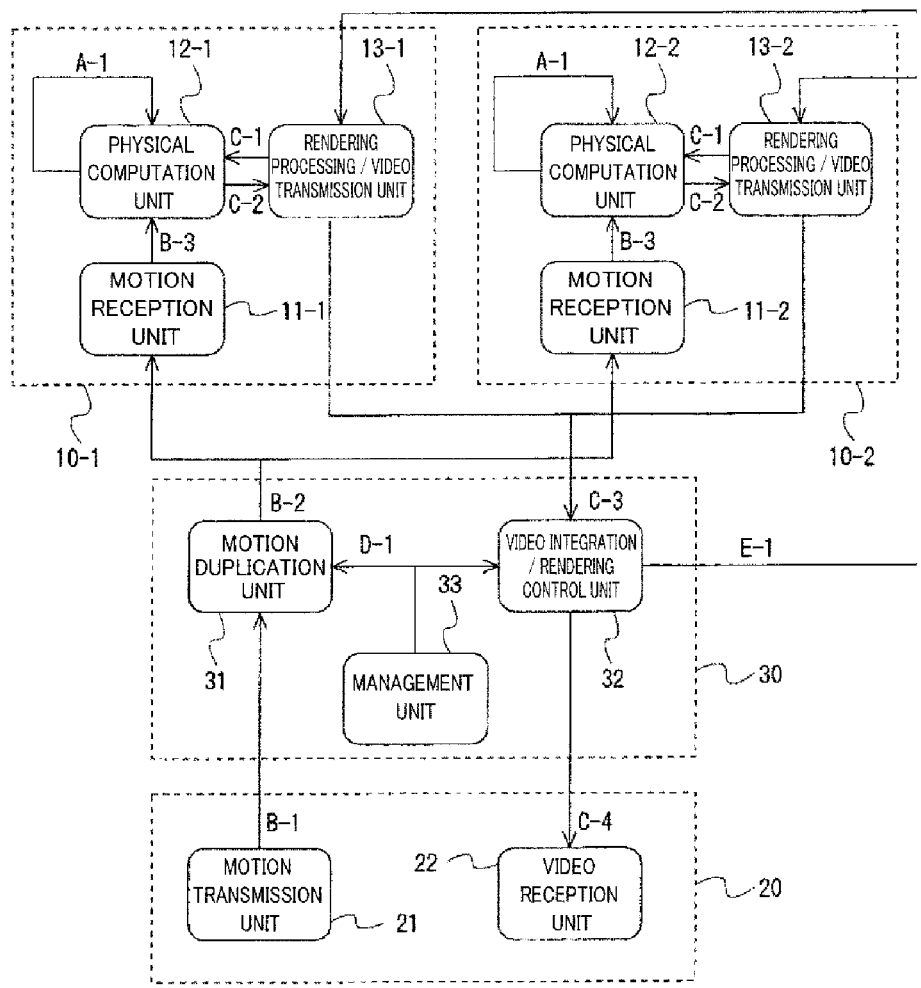

MEANING OF EACH INFORMATION FLOW
A-1: INFORMATION REGARDING PHYSICAL COMPUTATION OF VIRTUAL WORLD (1000 TIMES PER SECOND OR HIGHER)
B-1: MOTION INFORMATION TRANSMITTED FROM USER TERMINAL (100 TIMES PER SECOND OR HIGHER)
B-2: MOTION INFORMATION DUPLICATED SO AS TO BE SENT TO A PLURALITY OF VIRTUAL WORLDS
B-3: MOTION INFORMATION CONVERTED INTO FORMAT FOR PHYSICAL COMPUTATION
C-1: INFORMATION FOR INSTRUCTING PROCESSING SUCH AS RENDERING (10 TIMES PER SECOND OR HIGHER)
C-2: INFORMATION RELATED TO VIDEO
C-3: VIDEOS RENDERED AND GENERATED IN A PLURALITY OF VIRTUAL WORLDS
C-4: VIDEO APPEARING TO BE SENT FROM ONE VIRTUAL WORLD
D-1: INSTRUCTION TO ESTABLISH CONNECTION WITH VIRTUAL WORLD, ETC. (IRREGULAR)
E-1: NOTIFICATION INFORMATION INDICATING RENDERING TIMING (10 TIMES PER SECOND OR HIGHER)

Fig. 12

| | CONSISTENCY<br>A characteristic that, in cases of multiplayer operation, the states of virtual worlds corresponding to the players are identical | RESPONSIVENESS<br>A characteristic related to the speed at which virtual worlds respond to the players' actions | SCALABILITY<br>A characteristic representing the capability to address an increase in a processing load resulting from an increase in the number of players or an increase in the complexity of rendering |
|---|---|---|---|
| STAR | ◎<br>There is only one virtual world, and therefore information inconsistency does not occur | ×<br>If the players are dispersed, regarding a player whose client is located away from the server in terms of communication distance, the virtual world delays changing in response to actions, and there also is a delay in the provision of video | △<br>It is possible to address such an increase by scaling up the system, but there is a limitation, and it is not possible to scale out the system |
| MESH | ×<br>Each client application performs predictive actions, and therefore, when the clients are away from each other, the states of the virtual worlds may be inconsistent with each other | ◎<br>The client applications perform calculations for physical simulation of the virtual worlds in response to the players' actions and generate video, and immediate response can be achieved | ×<br>Scaling up of the client devices is more likely to reach the limitation compared to scaling up of the server, the number of links connecting clients with each other increases in proportion to the square of the number of players, and therefore it is difficult to address the issue |
| PRESENT INVENTION | ○<br>The same action information is transmitted, and therefore the states of the virtual worlds are almost the same unless there is a significant delay in information transmission | ○<br>Video can be acquired from the nearest server, and therefore it is less likely that a response is significantly delayed | ○<br>Both scaling up and scaling out can be supported |

Fig. 13
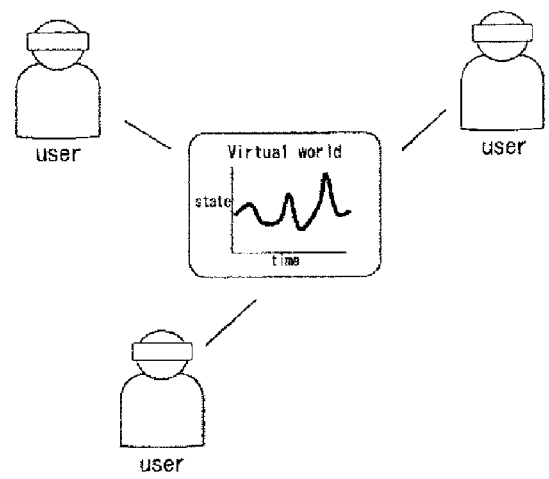
(a) STAR TYPE
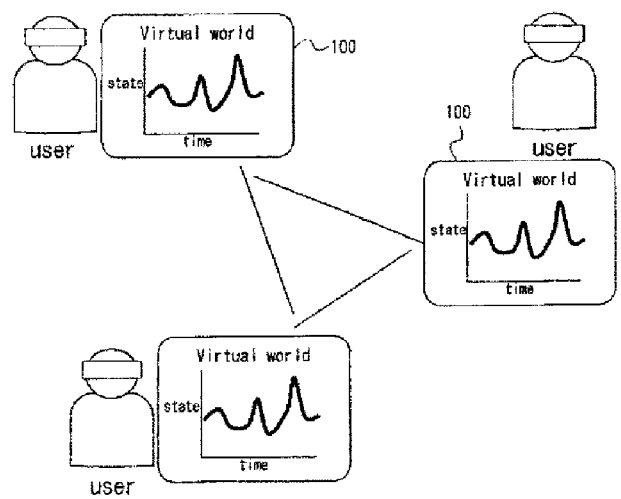
(b) MESH TYPE

VIRTUAL WORLD CONSTRUCTION SYSTEM AND METHOD

CROSS-REFERENCE TO RELATED APPLICATIONS

This application is a National Stage application under 35 U.S.C. § 371 of International Application No. PCT/JP2019/030333, having an International Filing Date of Aug. 1, 2019, which claims priority to Japanese Application Serial No. 2018-146591, filed on Aug. 3, 2018. The disclosure of the prior application is considered part of the disclosure of this application, and is incorporated in its entirety into this application.

TECHNICAL FIELD

The present invention relates to a virtual world construction system.

BACKGROUND ART

Conventionally, there are known virtual world construction systems for constructing a virtual world that a plurality of users can join, in a server on a network. For example, a multi-player online game is a game in which users play in a virtual world constructed by a virtual world construction system, and the users operate their alter egos (avatars) and other objects, which are present in the virtual world.

In this virtual world construction system, data regarding fixed objects among the objects with which the virtual world is constructed (for example, map data, structure data, avatar appearance data, etc.) is distributed to user terminals in advance. Each user terminal transmits information regarding user operations performed on an operation target such as an avatar, to a server. The server centrally manages the virtual world. The server computes, for each user terminal, the situation around the avatar in the virtual world, based on operation information received from the user terminal and fixed data distributed in advance, for example, and transmits variable data in the world around the avatar (for example, information regarding the positions of the other avatars and information regarding the positions of NPCs (Non Player Characters) around the avatar). Each user terminal renders images related to the virtual world and displays the images on the user terminal based on operation information regarding the avatar of the user, the fixed data distributed in advance, and the variable data received from the server, for example.

CITATION LIST

Non Patent Literature

[NPL 1] Gene Cheung and three other authors, "MULTI-STREAM SWITCHING FOR INTERACTIVE VIRTUAL REALITY VIDEO STREAMING", 2017
[NPL 1] Chen Gao and two other authors, "Concealing Jitter in Multi-Player Online Games through Predictive Behaviour Modeling", Proceedings of the 2016 IEEE 20th International Conference Computer Supported Cooperative Work in Design, 2016

SUMMARY OF THE INVENTION

Technical Problem

In recent years, VR/AR (Virtual Reality/Augmented Reality) has become widespread, and is employed in terminals in a virtual world construction system. Recently, it is easy to experience VR by using an HMD (Head Mounted Display) on which an SoC (System on a Chip) is mounted, or by attaching a smartphone to an HMD type goggles. However, rendering performance and the quality of experience in such cases are poorer than those provided by high-end HMD products that use the latest expensive GPU (Graphics Processing Unit). Therefore, it is considered to simply realize high-end VR experience by transmitting video information rendered by a GPU in a remote data center to a lightweight terminal such as a smartphone.

In the above-described conventional virtual world construction system, the connection configuration in the application layer is of a star type, in which one server and a plurality of user terminals are connected to each other (see FIG. 13(a)). Therefore, there is the following problem if rendering is performed by the server in the conventional virtual world system. That is to say, if user terminals are geographically dispersed, there is a problem in that, regarding a player using a user terminal that is away from the server in terms of communication distance, the virtual world delays changing in response to the player's actions, and there also is a delay in the provision of video.

Meanwhile, a distributed virtual world construction system has also been conceived of, in which the server does not centrally manage a virtual world, but instead each user terminal manages a virtual world. In this distributed virtual world construction system, the connection configuration in the application layer is of a mesh type in which user terminals are connected to each other in a peer-to-peer architecture (see FIG. 13(b)). The user terminals exchange operation information regarding their avatars with each other, for example, and each user terminal manages a virtual world. That is to say, there are the same number of virtual worlds as the user terminals.

However, in a virtual world construction system with a mesh-type connection configuration, if user terminals are geographically away from each other, a delay or the like may occur, and if data loss or the like occurs during communication between user terminals, the respective virtual worlds of the user terminals may become inconsistent with each other. In order to prevent such a situation, each user terminal may perform a predictive action by predicting operation information regarding other users. However, depending on the degree of delay or loss, it is difficult to completely eliminate such inconsistencies between the virtual worlds. In addition, in this virtual world system, each user terminal performs rendering processing, and therefore there is a problem in that it is difficult to employ terminals with low computation capabilities such as those mentioned above.

With the foregoing in view, it is an object of the present invention to provide a virtual world construction system and method that do not impair consistency between virtual worlds and place only small loads on terminals.

Means for Solving the Problem

To achieve the above-described object, a virtual world construction system according to the present invention includes: a user terminal including operation information transmission means for transmitting operation information in a virtual world, and display means for displaying video information obtained by rendering the virtual world; a plurality of servers each including a computation unit that performs computation processing regarding a virtual world based on operation information received from the user terminal, and rendering processing means for generating video information by rendering the virtual world computed by the computation unit, and transmitting the video information to the user terminal; and a proxy that is located on a communication path between the user terminal and the servers, and relays operation information and video information, wherein the proxy includes operation information duplication means for transmitting operation information received from the user terminal, to the plurality of servers, by duplicating the operation information, and video integration means for transmitting timing information regarding the timing of rendering to the plurality of servers, and transmitting video information received from at least one of the servers, to the user terminal, and the rendering processing means of each of the servers performs rendering processing and video information transmission processing based on timing information received from the proxy.

Effects of the Invention

According to the present invention, rendering processing, through which a virtual world is visualized, is not performed by a user terminal, but is performed by a server. Therefore, it is possible to reduce the load on the user terminal. Also, according to the present invention, although virtual worlds are constructed by a plurality of servers, each server performs computations regarding a virtual world based on the same operation information, and each server performs rendering processing based on timing information transmitted from a proxy. Therefore, it is possible to improve consistency between virtual worlds.

Also, according to the present invention, virtual worlds are constructed by a plurality of servers, and a user terminal can receive video information rendered by a server that is located near the user terminal in terms of communication distance. Therefore, it is possible to improve the quality of experience. Also, according to the present invention, a plurality of servers construct virtual worlds and render video information. Therefore, it is possible to realize high availability and a high frame rate by enabling the servers to cooperate with each other.

BRIEF DESCRIPTION OF DRAWINGS

FIG. 2 shows an architecture of a virtual world construction system according to the present invention.

FIG. 7 is a functional block diagram for the virtual world construction system.

FIG. 12 is a table comparing the present invention with other systems.

FIG. 13 shows a conventional architecture.

DESCRIPTION OF EMBODIMENTS

Figure 1:
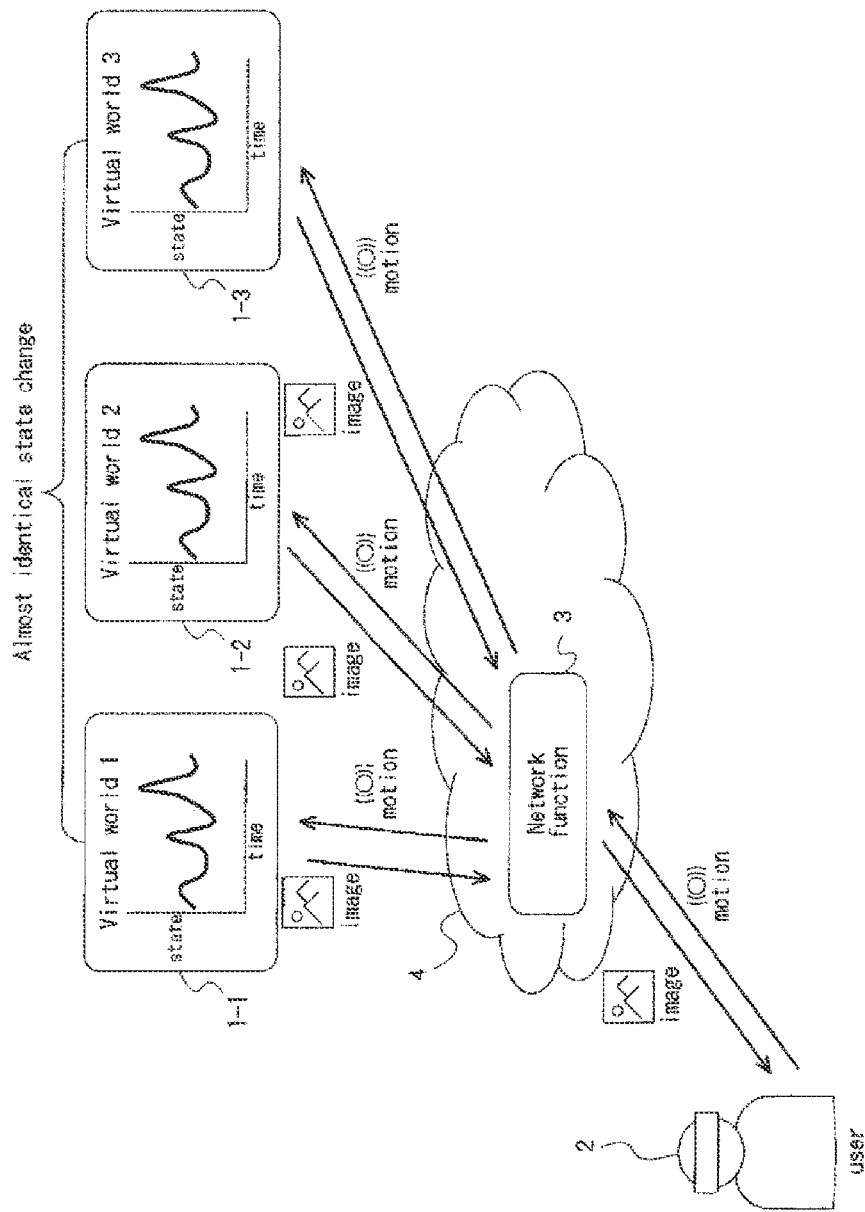
FIG. 1 is a conceptual diagram for a virtual world construction system according to the present invention.

A concept of a virtual world construction system according to the present invention will be described with reference to FIGS. 1 and 2. FIG. 1 is a conceptual diagram showing the virtual world construction system according to the present invention. FIG. 2 is a diagram showing the architecture of the virtual world construction system according to the present invention. In the following description, a plurality of apparatuses/components of the same type are given the same main reference numerals, and branch numbers follow the main reference numerals to refer to the individual apparatuses/components. When a plurality of apparatuses/components of the same type are collectively referred to, only the main reference numerals are used.

As shown in FIG. 1, in a virtual world construction system according to the present invention, a function 3 is provided on a network 4, the function 3 allowing the respective applications (client applications) of users 2 to be seen as if they communicate with one virtual world, despite a plurality of virtual worlds 1 exhibiting "almost" identical state changes on a plurality of different physical machines or virtual machines. As a result, according to the present invention, as shown in FIG. 2, the users 2 and the virtual worlds 1 may have a 1-to-N relationship (FIG. 2(a)) or a M-to-N relationship (FIG. 2(b)). In addition, according to the present invention, it is possible to achieve value-added services as described below.

Figure 3:
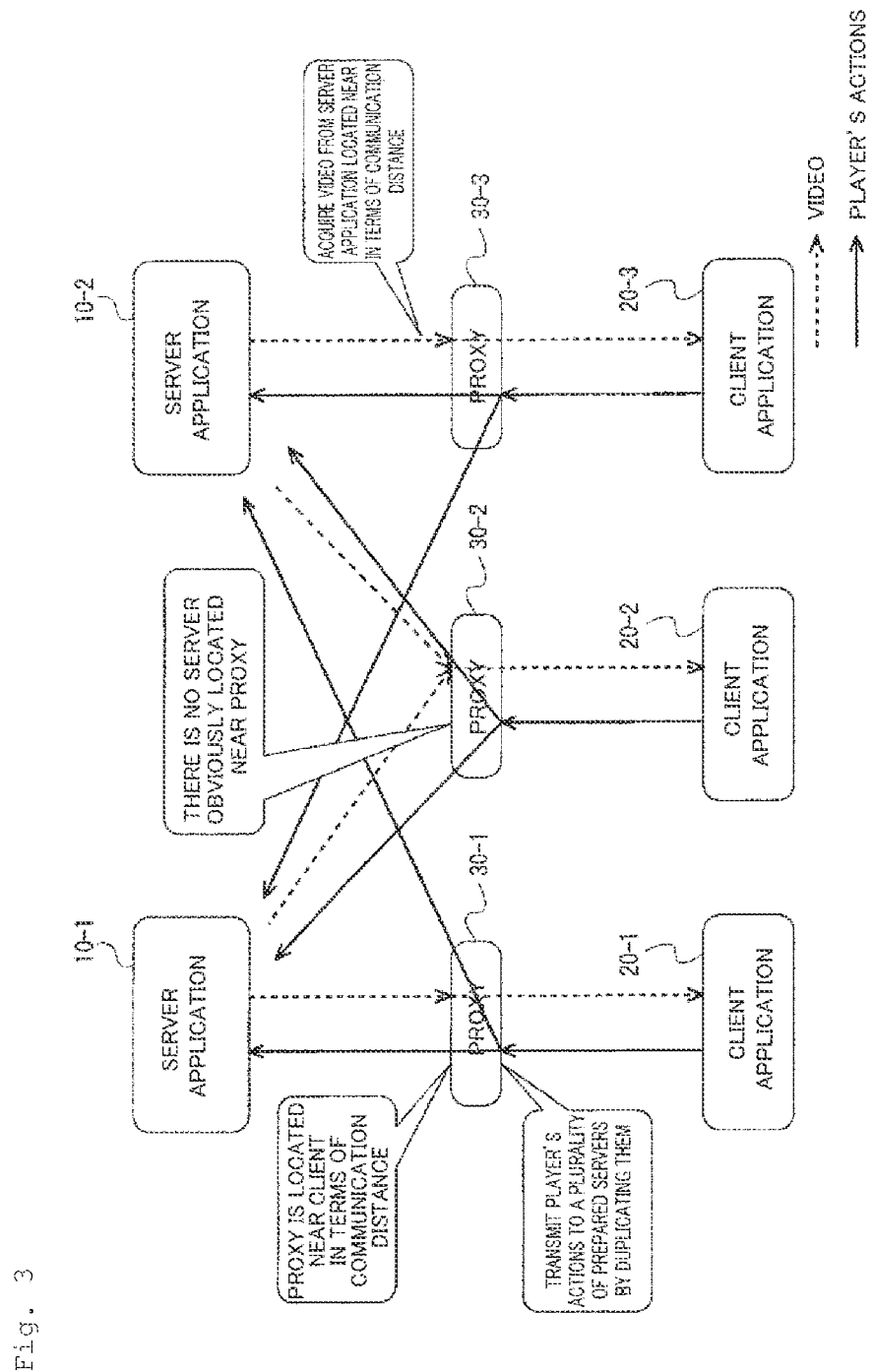
FIG. 3 is a conceptual diagram showing a virtual world construction system according to an embodiment of the present invention.

Next, a virtual world construction system according to an embodiment of the present invention will be described with reference to FIG. 3. FIG. 3 is a conceptual diagram showing a virtual world construction system according to an embodiment.

As shown in FIG. 3, the virtual world construction system according to the present embodiment includes a plurality of server applications 10 implemented in servers, client applications 20 implemented in user terminals, and proxies 30 implemented in servers located on communication paths between the user terminals in which the client applications 20 are implemented and servers in which the server applications 10 are implemented.

Here, the servers and the user terminals are each mainly constituted by a semiconductor apparatus, and may be configured as so-called information processing apparatuses that each include a CPU (Central Processing Unit), a volatile storage device such as a RAM (Random Access Memory), a non-volatile storage device such as a hard disk or a flash memory, and a communication interface that connects to external devices to communicate therewith. The servers and the user terminals may also be configured as virtualized computers. The servers may be dedicated machines in which the server applications 10 or the proxies 30 are implemented, or general-purpose machines.

One of the features of the present invention is that the proxies 30 are located near the client applications 20 in terms of communication distance.

The plurality of server applications 10 have the function of managing various kinds of information related to the virtual worlds (virtual world information). Furthermore, the plurality of server applications 10 have the function of processing virtual world information so as to change the virtual worlds based on user operation information (also referred to as "motion information") received from the client applications 20. Furthermore, each of the plurality of server applications 10 has the function of rendering video frames related to the virtual world for the client application 20 connected thereto, based on the virtual world information managed thereby, and transmitting the video frames to the client applications 20. It should be noted here that, according to the present invention, the plurality of server applications 10 are characterized in that they respectively manage virtual worlds, and the server applications 10 do not perform processing to synchronize the pieces of information regarding the virtual worlds.

The client applications 20 have the function of transmitting operation information, which is information related to user actions, and displaying video information received from the server applications 10 on the respective user terminals of the client applications 20.

The proxies 30 is interposed between the client applications 20 and the server applications 10, and have the function of relaying communication therebetween in the application layer. That is to say, the proxies 30 have the function of transmitting operation information received from the client applications 20 to the server applications 10, and transmitting video information received from the server applications 10 to the client applications 20. Here, the proxies 30 transmit operation information received from the client applications 20 to the plurality of server applications 10 by duplicating the operation information. Also, the proxies 30 acquire video information from the server applications 10 that are located near the proxies 30 in terms of communication distance, and transmit the video information to the client applications 20.

In the example shown in FIG. 3, the client application 20-1 transmits operation information to the proxy 30-1 that is located near the client application 20-1 in terms of communication distance. The proxy 30-1 transmits operation information to a plurality of server applications 10-1 and 10-2. The proxy 30-1 acquires video information from the server application 10-1 that is located near the proxy 30-1 in terms of communication distance, and transmits the video information to the client application 20-2. The same applies to the client application 20-3.

Meanwhile, in the example shown in FIG. 3, the client application 20-2 transmits operation information to the proxy 30-2 that is located near the client application 20-2 in terms of communication distance. The proxy 30-2 transmits operation information to a plurality of server applications 10-1 and 10-2. Regarding the proxy 30-2, there is no server applications 10 located near the proxy 30-2 in terms of communication distance, and therefore the proxy 30-2 acquires video information from a plurality of server applications 10-1 and 10-2, and transmit either one or both of the pieces of video information to the client application 20-2.

Figure 4:
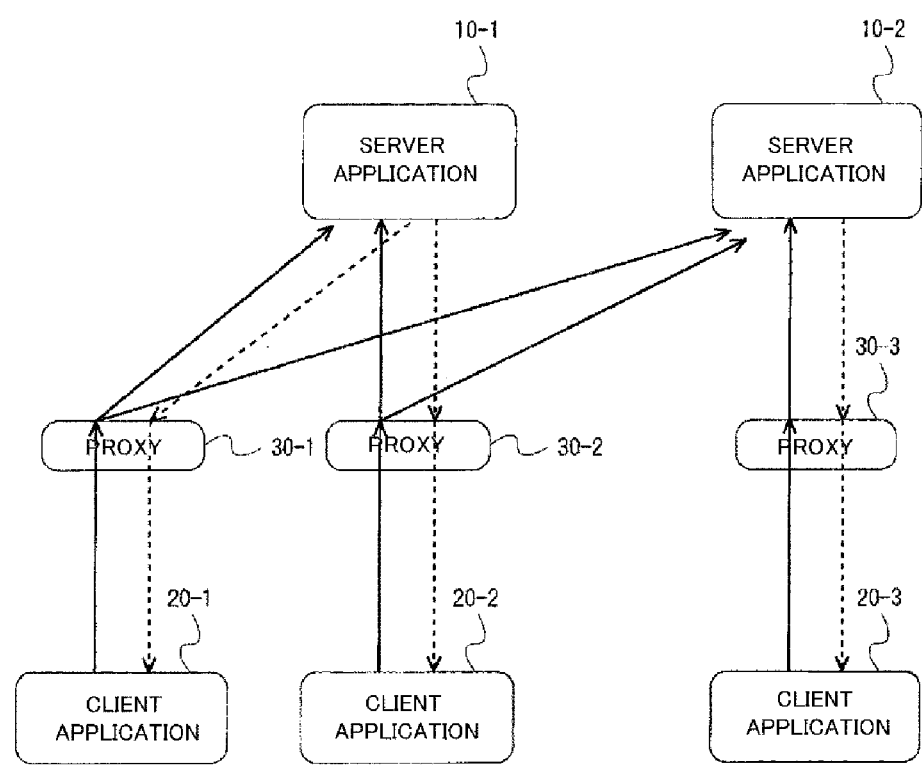
FIG. 4 is a diagram illustrating effects of the virtual world construction system according to the embodiment of the present invention.

In the virtual world construction system according to the present embodiment, as shown in FIG. 4, when multiple users communicate with each other in virtual worlds, connections are established such that each user can receive video information rendered in the nearest virtual world from among a plurality of virtual worlds. Therefore, it is possible to improve the quality of experience.

Figure 5:
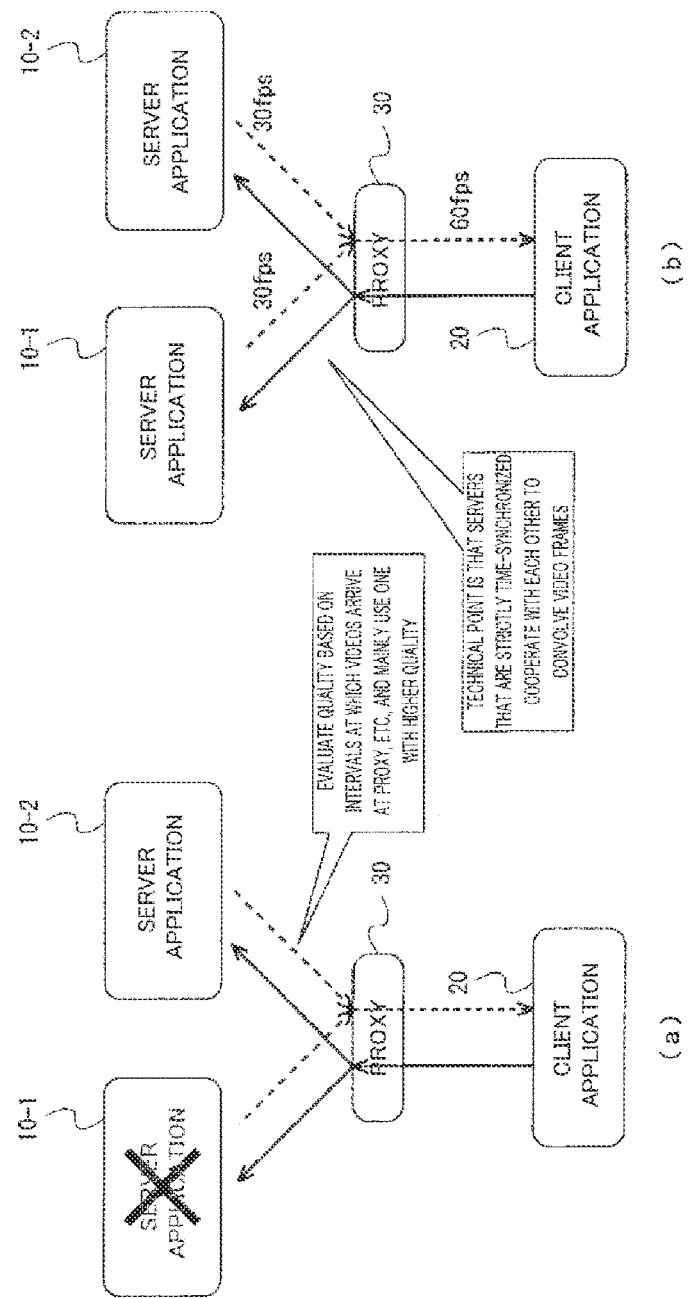
FIG. 5 is a diagram illustrating effects of the virtual world construction system according to the embodiment of the present invention.

Also, in the virtual world construction system according to the present embodiment, as shown in FIG. 5, virtual worlds that are redundantly constructed on a plurality of different physical machines are enabled to cooperate with each other using a network technology. Thus, it is possible to realize high availability and a high frame rate. In a normal state, as shown in FIG. 5(a), the quality of communication between the proxies 30 and the server applications 10 may be evaluated based on intervals at which pieces of video information arrive at the proxies 30, and video information from the highly-evaluated server application 10-2 may be mainly used. Also, in a normal state, as shown in FIG. 5(b), it is possible to realize a high frame rate by server applications 10 that are strictly time-synchronized cooperating with each other to convolve video frames.

To realize the above-described functions, it is necessary to manage the time required for control information (operation information) related to motion to reach the virtual worlds. The virtual world construction system according to the present embodiment is provided with a mechanism for establishing connections in advance and evaluating the quality of the connections. Also, the proxies 30 are required to notify the server applications 10 of rendering timing. The virtual world construction system according to the present embodiment performs such notification at short intervals, and thus realizes video convolution and failover. Also, the virtual world construction system according to the present embodiment manages time synchronization or time lags between the virtual worlds (machines).

Figure 6:
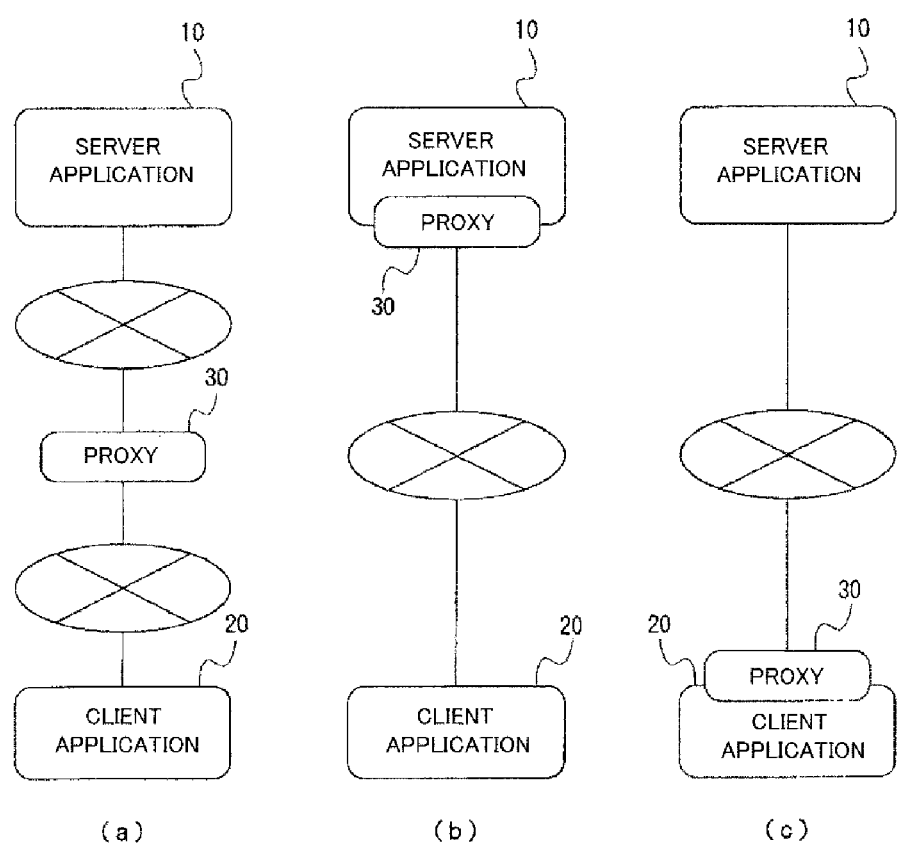
FIG. 6 is a diagram illustrating an example of arrangement of a proxy.

Next, an example of arrangement in the virtual world construction system according to the present embodiment will be described with reference to FIG. 6. FIG. 6(a) shows a configuration in which a proxy 30 is located at a geographically different position relative to a server application 10 and a client application 20. In a typical example of this configuration, a user terminal in which a client application 20 is implemented is accommodated in a carrier network, using an edge router in the carrier network. A proxy 30 is provided in the same server as the edge router, or a server located near the edge router. Server applications 10 are geographically dispersed in the communication carrier network, in a plurality of areas. A client application 20 uses the proxy 30 located near the edge router in which the user terminal is accommodated.

Note that this typical example employs a so-called "edge computing" technology. Compared with cloud computing, edge computing has fewer computing resources per location due to the limited size of the installation area. Therefore, in consideration of reliability, it may be desirable to provide a large number of relatively small machines rather than a small number of large machines.

FIG. 6(b) shows a configuration in which a proxy 30 is provided for each server application 10, in the same server as the server application or a server located near the server. In a typical example of this configuration, server applications 10 and proxies 30 are geographically dispersed in the communication carrier network, in a plurality of areas. A client application 20 uses the proxy 30 provided in the area in which the user terminal is accommodated.

FIG. 6(c) shows a configuration in which a proxy 30 is provided in an apparatus located near a client application 20. In a typical example of this configuration, a user terminal in which a client application 20 is implemented is connected to a home apparatus (also referred to as a home gateway) installed in the user's house. Note that a home apparatus is an apparatus used to accommodate a user terminal in the carrier network. The proxy 30 is implemented as one of the functions of the home apparatus. Alternatively, the proxy 30 may be provided as an apparatus that is separate from the home apparatus, within a LAN provided in the user's house.

Next, a detailed configuration of the virtual world construction system according to the present embodiment will be described with reference to FIG. 7. FIG. 7 is a detailed functional block diagram for the virtual world construction system according to the present embodiment.

The client application 20 includes a motion transmission unit 21 that transmits user operation information to the proxy 30, and a video reception unit 22 that receives video information received from the proxy 30. The motion transmission unit 21 transmits operation information at a frequency of 100 times per second or higher, for example.

Each of the server applications 10 includes a motion reception unit 11 that receives operation information from the proxy 30, a physical computation unit 12 that applies predetermined processing to the virtual world managed by the server application 10, based on the operation information, and a rendering processing/video transmission unit 13 that performs rendering processing regarding the virtual world processed by the physical computation unit 12, to generate video information, and transmits the video information to the proxy 30. The physical computation unit 12 performs physical computation regarding the virtual world at a frequency of 1000 times per second or higher, for example. The physical computation unit 12 also receives information that instructs to perform processing such as rendering from the rendering processing/video transmission unit 13 at a frequency of ten times per second or higher, for example, and transmits information related to video to the rendering processing/video transmission unit 13. The rendering processing/video transmission unit 13 performs rendering processing and video information transmission processing in cooperation with the physical computation unit 12, to transmit video information according to rendering timing notified by the proxy 30.

The proxy 30 includes a motion duplication unit 31, a video integration/rendering control unit 32, and a management unit 33. The motion duplication unit 31 transmits operation information received from the client application 20 to the plurality of server applications 10 by duplicating the operation information. The video integration/rendering control unit 32 transmits video information received from the server applications 10 to the client application 20. The management unit 33 manages and controls the actions performed by the motion control unit 31 and the video integration/rendering control unit 32. The video integration/rendering control unit 32 performs processing to integrate video information, such as selection and integration of video information received from the plurality of server applications 10 (frame convolution processing), and transmits the video information resulting from integration to the client applications 20. The video integration/rendering control unit 32 also transmits rendering timing notification information to the rendering processing/video transmission unit 13 at a frequency of ten times per second, for example. The management unit 33 instructs the motion duplication unit 31 and the video integration/rendering control unit 32 to establish a connection with the server applications 10, for example.

Figure 8:
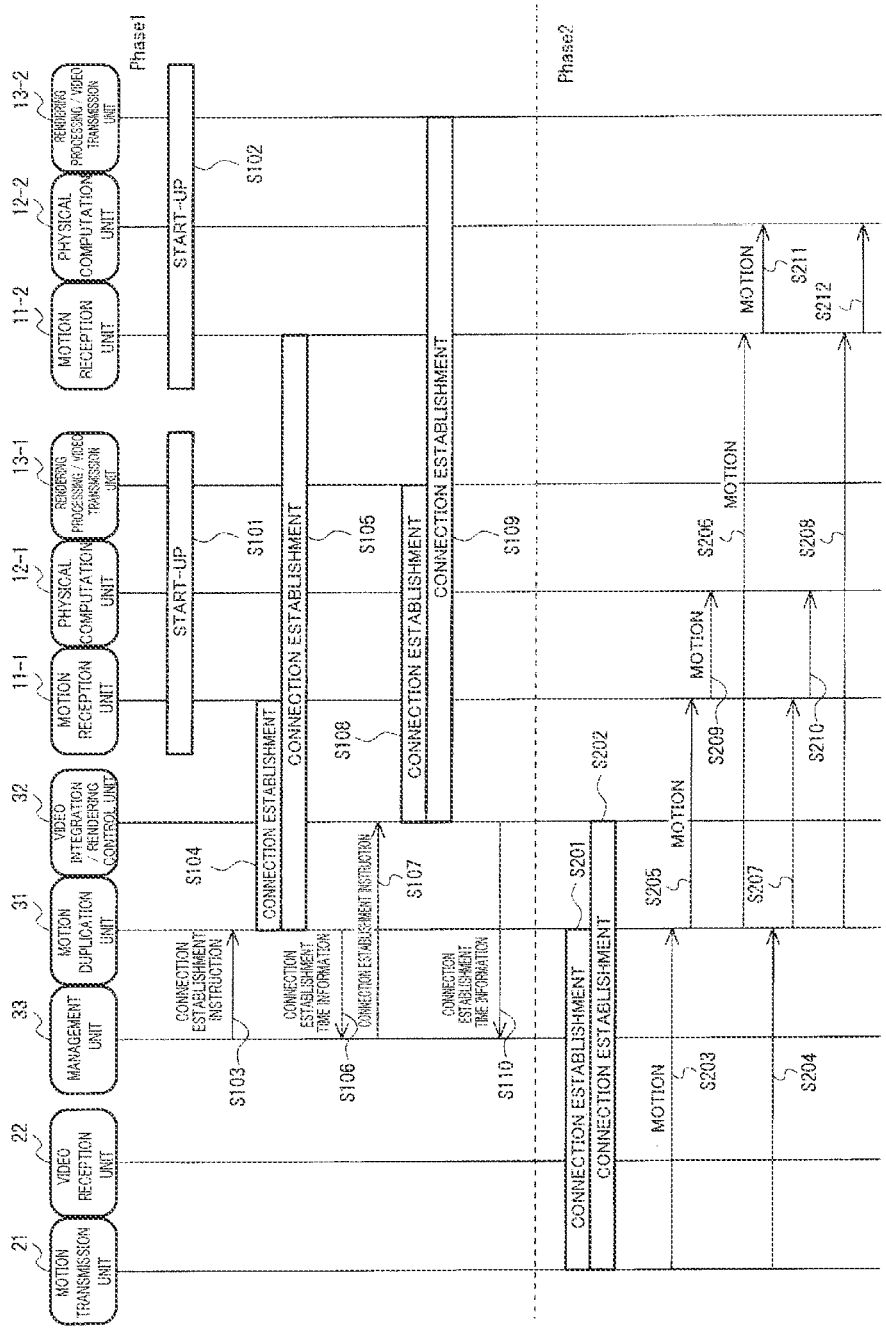
FIG. 8 is a sequence chart for initial processing and operation information transmission processing.

Next, actions performed by the virtual world construction system according to the present embodiment will be described with reference to FIGS. 8 to 11. First, initial processing and operation information transmission processing will be described with reference to FIG. 8. FIG. 8 is a sequence chart for initial processing and operation information transmission processing.

First, it is assumed that, in initial processing (denoted as "Phase 1" in FIG. 8), the server applications 10 have been started up before the processing to be performed by the client application 20 starts (steps S101 and S102). Upon the management unit 33 of the proxy 30 instructing the motion duplication unit 31 to establish a connection (step S103), the motion duplication unit 31 establishes a connection with the respective motion reception units 11 of the server applications 10 (steps S104 and S105). Upon receiving connection establishment time information from the motion duplication unit 31 (step S106), the management unit 33 instructs the video integration/rendering control unit 32 to establish a connection (step S107). The video integration/rendering control unit 32 establishes connections with the respective rendering processing/video transmission units 13 of the server applications 10 (step S108 and S109), and transmits connection establishment time information to the management unit 33 (step S110).

Next, in operation information transmission processing (denoted as "Phase 2" in FIG. 8), the client application 20 establishes connections with the motion duplication unit 31 and the video integration/rendering control unit 32 of the proxy 30 (step S201 and S202). Thereafter, the client application 20 transmits operation information (motion information) to the motion duplication unit 31 of the proxy 30 as needed (steps S203 and S204). The motion duplication unit 31 of the proxy 30 duplicates and transmits operation information to the respective motion reception units 11 of the server applications 10 (steps S205 to S208). The respective motion reception units 11 of the server applications 10 transmit transmission information to the physical computation units 12 (steps S209 to S212).

Figure 9:
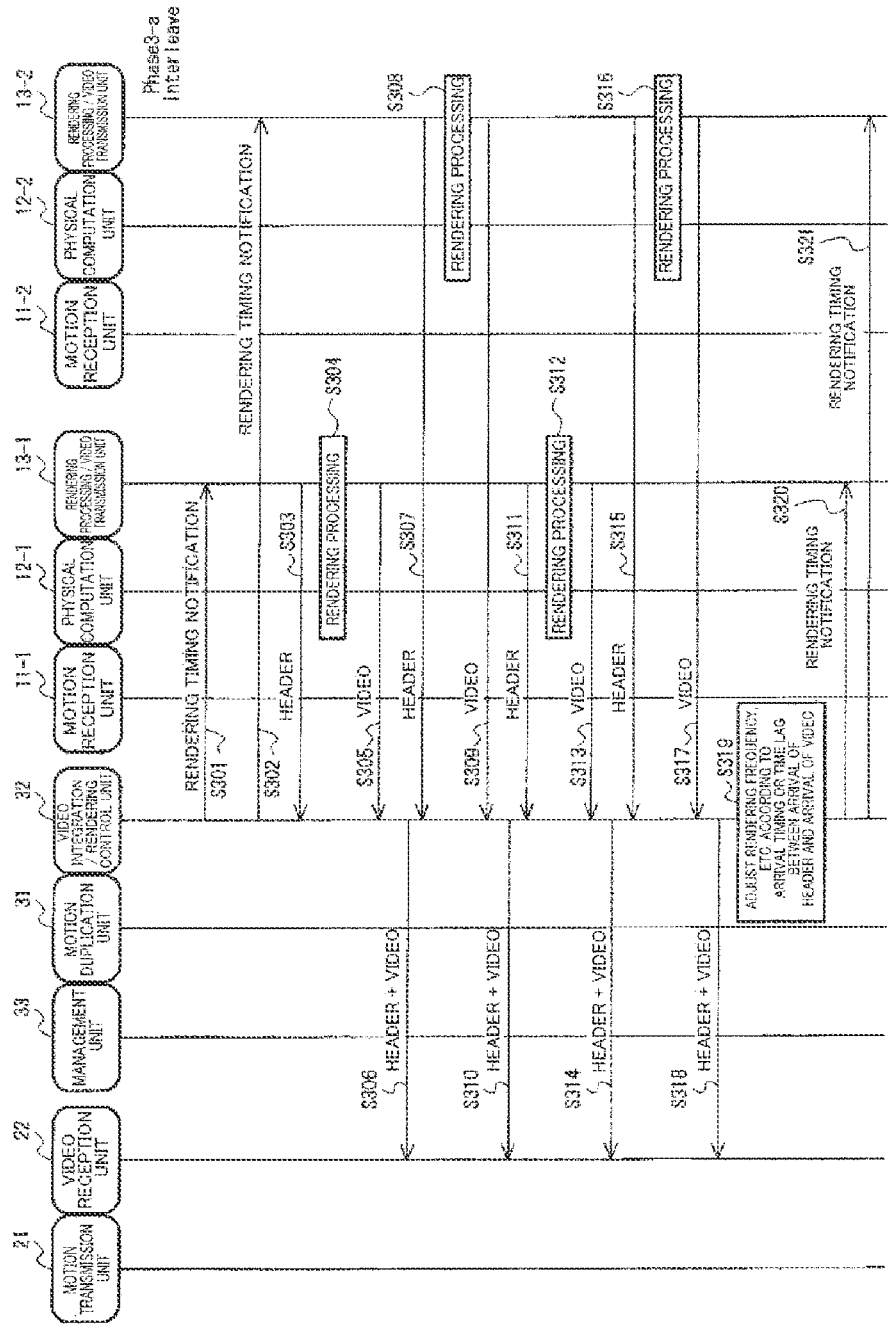
FIG. 9 is a sequence chart for interleave processing.

Next, processing (interleave processing) in which the proxy 30 alternatingly transmits pieces of video information received from a plurality of server applications 10 to the client application 20 will be described with reference to FIG. 9. FIG. 9 is a sequence chart for interleave processing.

The video integration/rendering control unit 32 of the proxy 30 notifies the respective rendering processing/video transmission units 13 of the server applications 10 of rendering timing (step S301 and S302). In the present embodiment, rendering timing is notified such that the server applications 10-1 and 10-2 alternatingly transmit video information, i.e. the proxy 30 alternatingly receives video information from the server applications 10-1 and 10-2.

The respective physical computation units 12 of the rendering processing/video transmission units 13 of the server applications 10 cooperate to perform rendering processing and transmit video information according to the notified timing. Here, focusing on the application layer, it is possible to divide video information transmission processing into header information transmission and video information body transmission. In the present embodiment, in order to enable the proxy 30 to accurately grasp timing, each rendering processing/video transmission unit 13 first transmits header information (steps S303, S307, S311, and S315), thereafter cooperates with a physical computation unit 12 to perform rendering processing (step S304, S307, S312, and S316), and thereafter transmits video information body (steps S305, S309, S313, and S317).

The video integration/rendering control unit 32 of the proxy 30 sequentially transmits, to the video reception unit 22 of the client application 20, pieces of video information each constituted by the header information and the video information body received from one of the respective rendering processing/video transmission units 13 of the server applications 10 (steps S306, S310, S314, and S318).

The video integration/rendering control unit 32 of the proxy 30 adjusts, for example, the frequency of rendering, based on the timing of arrival of information received from each server applications 10 and the time lag between the arrival of the header and the arrival of video information body (step S319), and notifies the respective rendering processing/video transmission units 13 of the server applications 10 of rendering timing (steps S320 and S321).

Next, an example of failover processing performed in video information transmission processing will be described with reference to FIG. 10. This failover processing is based on the presumption that the proxy 30 transmits video information from only one server application 10 to the client application 20.

Figure 10:
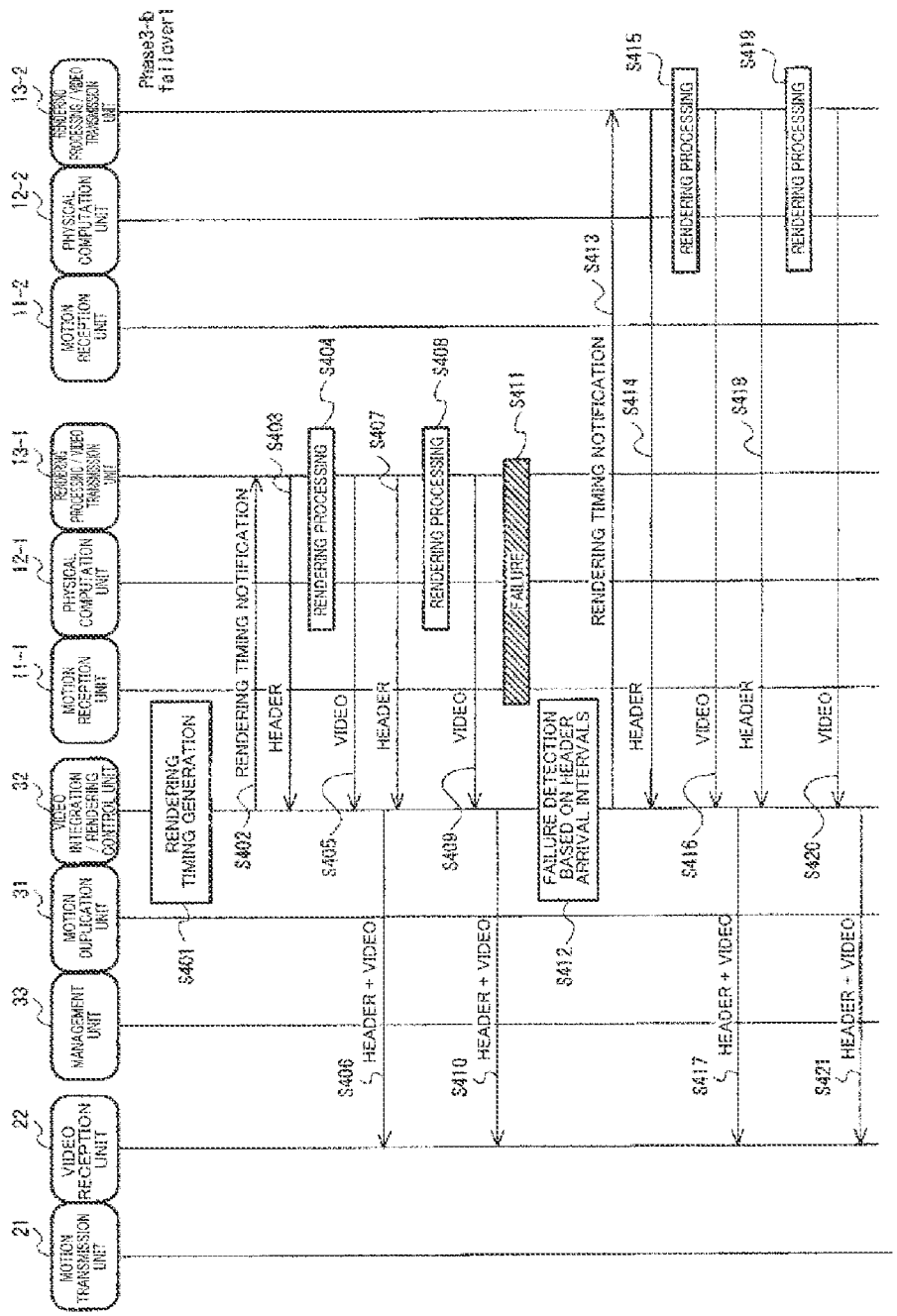
FIG. 10 is a sequence chart for fail-safe processing.

As shown in FIG. 10, in a normal state, upon generating rendering timing (step S401), the video integration/rendering control unit 32 of the proxy 30 only notifies the rendering processing/video transmission unit 13-1 of the server application 10-1 of the rendering timing (step S402). Thereafter, as in the above-described processing, video information is transmitted from the rendering processing/video transmission unit 13-2 of the server application 10-1 to the video reception unit 22 of the client application 20 (steps S403 to S410).

Here, it is assumed that a failure has occurred in the server application 10-1 (step S411). As a result, the proxy 30 cannot receive video information from the server application 10-1, from which video information has been transmitted to the client application 10 until this point. The video integration/rendering control unit 32 of the proxy 30 detects the occurrence of the failure based on the arrival intervals of headers (step S412). The video integration/rendering control unit 32 of the proxy 30 transmits rendering timing notification to the rendering processing/video transmission unit 13-2 of the server application 10-2 (step S413), and thereafter transmits video information received from the server application 10-1 to the video reception unit 22 of the client application 20 (steps S414 to S421).

Next, another example of failover processing performed in a video information transmission stage will be described with reference to FIG. 11. This failover processing is based on the presumption that the proxy 30 transmits only one of the pieces of video information received from the two server applications 10 to the client application 20.

Figure 11:
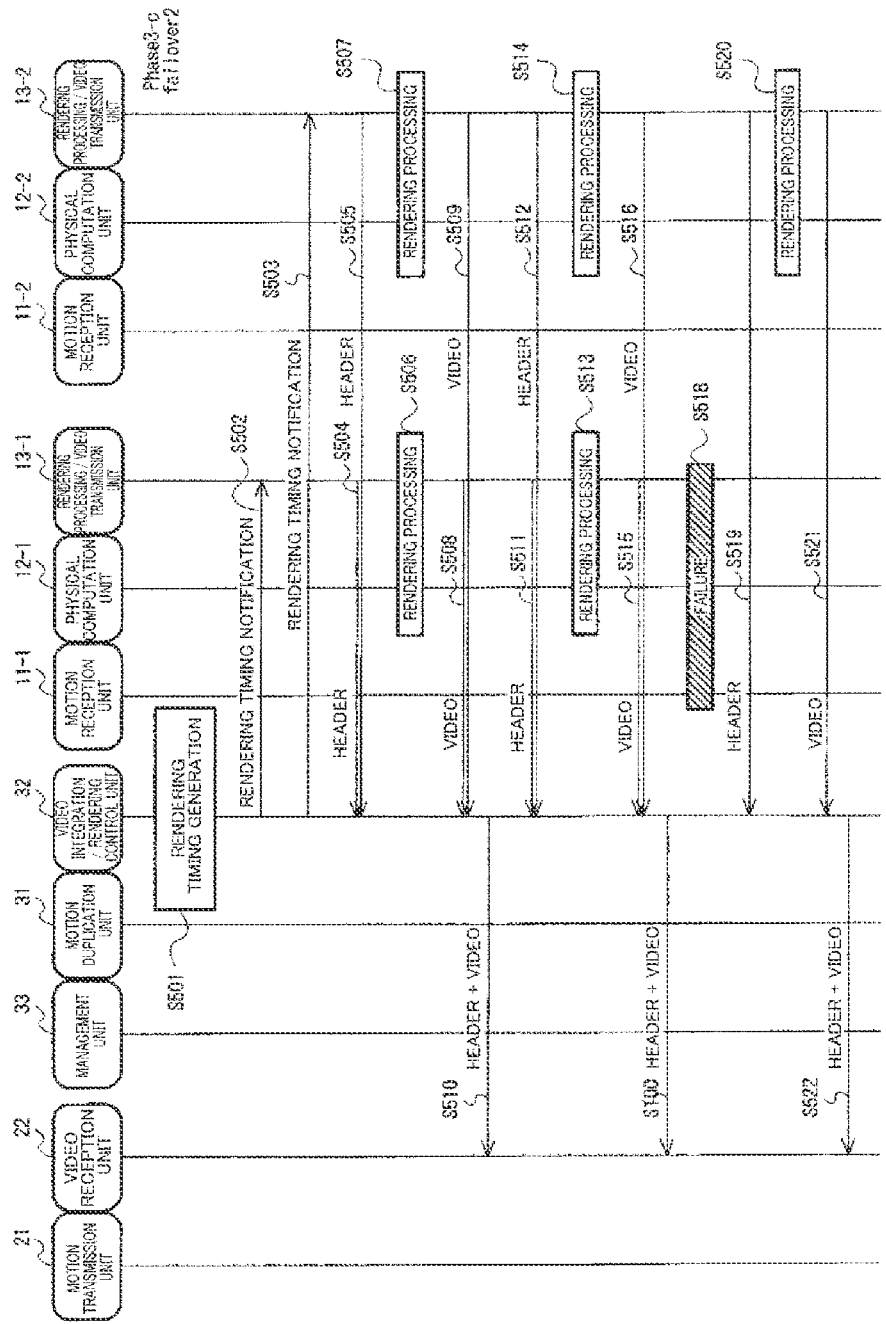
FIG. 11 is a sequence chart for fail-safe processing according to another example.

As shown in FIG. 11, in a normal state, upon generating rendering timing (step S501), the video integration/rendering control unit 32 of the proxy 30 notifies the respective rendering processing/video transmission units 13 of the server applications 10 of the rendering timing (steps S502 and S503). In this example, rendering timing is set such that the server applications 10 transmit video information according to substantially the same timing.

As in the above-described processing, the respective rendering processing/video transmission units 13 of the server applications 10 transmit video information to the video integration/rendering control unit 32 of the proxy 30 (steps S504 to S509 and S511 to S516). The video integration/rendering control unit 32 of the proxy 30 transmits, to the video reception unit 22 of the client application 20, only one of the received pieces of video information, which is, in the example shown in FIG. 11, the video information received from the rendering processing/video transmission unit 13-1 of the server application 10-1 (steps S510 and S517).

Here, it is assumed that a failure has occurred in the server application 10-1 (step S518). As a result, the proxy 30 cannot receive video information from the server application 10-1, from which video information has been transmitted to the client application 10 until this point. The video integration/rendering control unit 32 of the proxy 30 thereafter transmits, to the video reception unit 22 of the client application 20, only the video information received from the rendering processing/video transmission unit 13-2 of the other server application 10-2 (steps S519 to S522).

The actions and effects of the present invention compared with conventional star-type and mesh-type configurations (see FIG. 13) will be described with reference to FIG. 12. FIG. 12 is a table comparing the present invention with other systems.

<Consistency>

Consistency is a characteristic that, in cases of multiplayer (multiuser) operation, the states of virtual worlds corresponding to the players are identical. In the case of the star type, there is only one virtual world, and therefore information inconsistency does not occur. In the case of the mesh type, each client application performs predictive actions, and therefore, when the clients are away from each other, the states of the virtual worlds may be inconsistent with each other. According to the present invention, the same action information is transmitted, and therefore the states of the virtual worlds are almost the same unless there is a significant delay in information transmission.

<Responsiveness>

Responsiveness is a characteristic related to the speed at which virtual worlds respond to the players' actions. In the case of the star type, if the players are dispersed, regarding a player whose client is located away from the server in terms of communication distance, the virtual world delays changing in response to actions, and there also is a delay in the provision of video. In the case of the mesh type, the client applications perform calculations for physical simulation of the virtual worlds in response to the players' actions and generate video, and therefore immediate response can be achieved. In the case of the present invention, video can be acquired from the nearest server, and therefore it is less likely that a response is significantly delayed.

<Scalability>

Scalability is a characteristic representing the capability to address an increase in a processing load resulting from an increase in the number of players or an increase in the complexity of rendering. In the case of the star type, it is possible to address such an increase by scaling up the system, but there is a limitation, and it is not possible to scale out the system. In the case of the mesh type, scaling up of the client devices is more likely to reach the limitation compared to scaling up of the server, and the number of links connecting clients with each other increases in proportion to the square of the number of players, and therefore it is difficult to address the issue. In the case of the present invention, both scaling up and scaling out can be supported.

Although an embodiment of the present invention has been described above in detail, the present invention is not limited to the embodiment. For example, in the above embodiment, when fail-safe is to be realized, in a normal state, the quality of communication is employed as an indicator used to select a piece of video information that is to be transmitted to the client application 20, from among the pieces of video information received from the plurality of server applications 10. In this example, the quality of communication is calculated based on, for example, intervals at which pieces of video information arrive at the proxies 30. However, the quality of communication may be calculated based on another parameter such as a packet loss rate or a jitter. Also, an indicator other than the quality of communication such as attribute information regarding the servers on which the server applications 10 are implemented may be used as the indicator.

REFERENCE SIGNS LIST

10 Server application
11 Motion reception unit

12 Physical computation unit
13 Rendering processing/Video transmission unit
20 Client application
21 Motion transmission unit
22 Video reception unit
30 Proxy

The invention claimed is:

1. A virtual world construction system comprising:
a user terminal including
an operation information transmission unit, including one or more processors, for transmitting operation information in a virtual world, and
a display for displaying video information obtained by rendering the virtual world;
a plurality of servers each including
a computation unit including one or more processors, for performing computation processing regarding a virtual world based on operation information received from the user terminal, and
a rendering processing unit, including one or more processors, for generating video information by rendering the virtual world computed by the computation unit, and for transmitting the video information to the user terminal; and
a proxy that is located on a communication path between the user terminal and the servers, and is configured to relay operation information and video information, wherein the proxy includes
an operation information duplication unit, including one or more processors, for transmitting operation information received from the user terminal, to the plurality of servers, by duplicating the operation information, and
a video integration unit, including one or more processors, configured to:
transmit timing information regarding the timing of rendering to the plurality of servers,
transmit video information received from at least one of the servers, to the user terminal,
adjust rendering timing based on timing of arrival of information received from the server and a time lag between arrival of a header and arrival of a video information body, and
transmit information regarding the adjusted rendering timing to the servers, and
the rendering processing unit of each of the servers is configured to perform rendering processing and video information transmission processing based on timing information received from the proxy.

2. The virtual world construction system according to claim 1, wherein the video integration unit of the proxy is configured to transmit timing information to the plurality of servers to alternatingly receive pieces of video information from the plurality of servers, and sequentially to transmit the pieces of video information received from the plurality of servers to the user terminal.

3. The virtual world construction system according to claim 1, wherein the video integration unit of the proxy is configured to transmit, to the user terminal, a piece of video information received from a server that is located near the proxy in terms of communication distance, from among the pieces of video information received from the plurality of servers.

4. The virtual world construction system according to claim 3, wherein, upon being unable to receive video information from a server from which video information is transmitted to the user terminal, the video integration unit of the proxy is configured to transmit video information received from another server to the user terminal.

5. The virtual world construction system according to claim 1, wherein the video integration unit of the proxy is configured to evaluate the quality of communication between the proxy and each of the plurality of servers based on pieces of video information received from the plurality of servers, and to transmit, to the user terminal, a piece of video information received from a highly-evaluated server, from among the pieces of video information received from the plurality of servers.

6. A virtual world construction method for a virtual world construction system including:
a user terminal including
an operation information transmission unit, including one or more processors, for transmitting operation information in a virtual world, and
a display for displaying video information obtained by rendering the virtual world;
a plurality of servers each including
a computation unit, including one or more processors, that performs computation processing regarding a virtual world based on operation information received from the user terminal, and
a rendering processing unit, including one or more processors, for generating video information by rendering the virtual world computed by the computation unit, and for transmitting the video information to the user terminal; and
a proxy that is located on a communication path between the user terminal and the servers, and relays operation information and video information, the virtual world construction method comprising:
transmitting, by the operation information duplication unit of the proxy, operation information received from the user terminal, to the plurality of servers, by duplicating the operation information;
transmitting, by the video integration unit of the proxy, timing information regarding rendering timing, to the plurality of servers;
performing, by the rendering processing unit of each of the servers, rendering processing and video information transmission processing based on the timing information received from the proxy;
adjusting, by the video integration unit of the proxy, rendering timing based on timing of arrival of information received from the server and a time lag between arrival of a header and arrival of a video information body;
transmitting, by the video integration unit of the proxy, information regarding the adjusted timing to the servers; and
transmitting, by the video integration unit of the proxy, video information received from at least one of the servers, to the user terminal.

7. The virtual world construction method according to claim 6, further comprising: transmitting, by the proxy timing information to the plurality of servers to alternatingly receive pieces of video information from the plurality of servers; and
transmitting, by the proxy, the pieces of video information received from the plurality of servers to the user terminal.

8. The virtual world construction method according to claim 6, further comprising: transmitting to the user terminal, by the proxy, a piece of video information received from a server that is located near the proxy in terms of communication distance, from among the pieces of video information received from the plurality of servers.

9. The virtual world construction method according to claim 8, further comprising: upon being unable to receive video information from a server from which video information is transmitted to the user terminal, transmitting, by the proxy, video information received from another server to the user terminal.

10. The virtual world construction method according to claim 6, further comprising: evaluating, by the proxy, the quality of communication between the proxy and each of the plurality of servers based on pieces of video information received from the plurality of servers; and transmitting to the user terminal, by the proxy, a piece of video information received from a highly-evaluated server, from among the pieces of video information received from the plurality of servers.

* * * * *